Dec. 20, 1966  C. H. YOUNGBERG ET AL  3,292,716
DISK HARROW

Filed April 6, 1964  2 Sheets-Sheet 2

INVENTORS
CHARLES H. YOUNGBERG
WILLARD E. PETERSON
BY John C. Thompson
ATTORNEY 3,292,716
DISK HARROW
Charles H. Youngberg, Moline, and Willard E. Peterson, Colona, Ill., assignors to Deere & Company, Moline, Ill., a corporation of Illinois
Filed Apr. 6, 1964, Ser. No. 357,427
1 Claim. (Cl. 172—595)

The present invention relates generally to agricultural implements, and more particularly to large heavy-duty double-action tandem disk harrows of the type known in the trade as plowing harrows.

The principal object of the present invention is to provide a harrow structure, whose width and working length are greater than the maximum width permissible for highway transportation without a special license, the harrow having means which will permit the overall length of the harrow to be reduced to less than the maximum legal width thereby permitting the harrow to be transported sidewise on a flatbed truck To this end it is an object of the present invention to provide a harrow structure in which the disk gangs can be moved from their working position, in which they extend forwardly and rearwardly of a rigid supporting frame structure to a position within the front and rear confines of the rigid frame structure. It is a further object of the present invention to provide a harrow draft frame structure which can easily be removed from a rigid harrow gang carrying frame structure.

These and other objects and advantages of this invention will be apparent to those skilled in the art after a consideration of the following detailed description, taken in conjunction with the accompanying drawings, in which the preferred form of this invention is illustrated.

Figure 1:
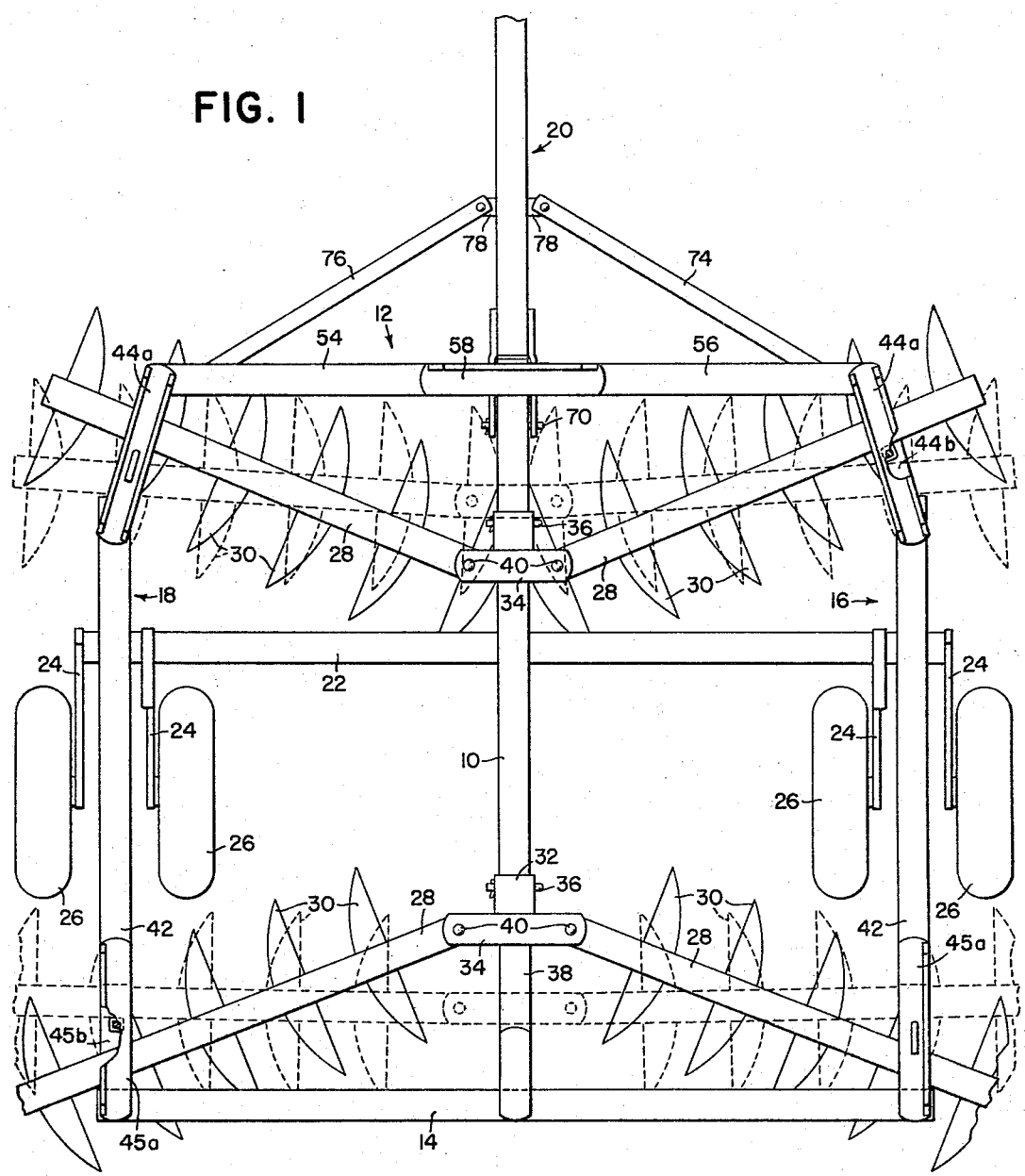
FIG. 1 is a plan view of the harrow of the present invention, the harrow being shown in its working position in full lines, and in its transport position in dotted lines.

It has been found when using a large plowing-type harrow of the class to which this invention pertains that when the harrow is transported on a truck over state highways it is either necessary to get a special license from the state for highway transportation since the width and length of these harrows exceed the maximum permissible legal width, or to dismantle the harrow and load it on a truck for transportation on the highways. For example, if a harrow is used on a road construction project for pulverizing, mixing or compacting the roadbed, it is necessary when the job has been completed to move the harrow to another location, sometimes this location being many miles away. Thus when moving the harrow from one construction site to another it is a practice generally to load the harrow upon a flatbed truck and to transport it over state highways. Since the conventional tractors of the day are capable of drawing large harrows having a width and length greater than the legal maximum width it is necessary to secure a special license to transport these harrows in this fashion. However, in applicant's construction the foregoing disadvantages are avoided by the simple expediency of removing the draft frame from the harrow, collapsing the gangs, and mounting the harrow sidewise on a flatbed truck, the overall length of the harrow then being less than the maximum permissable width, which in most states is 96".

In the following description right-hand and left-hand reference is determined by standing to the rear of the harrow and facing the direction of travel.

The harrow of the present invention has a rigid generally rectangular framework which includes a longitudinally extending rigid main frame member 10, a front transverse frame structure, indicated generally at 12, the front frame structure being rigidly secured at its midportion to the forward end of the main frame member 10, and a rear transverse frame structure 14 which is in turn rigidly secured at its midportion to the rearward end of the main frame member 10. Secured to the outer ends of the transverse frame structures 12 and 14 are right-hand and left-hand longitudinally extending outer frame structures indicated generally at 16 and 18, respectively. A draft frame 20 is normally mounted on the harrow frame and is adapted to be secured to a tractor or similar propelling device in a conventional manner. A rockshaft 22 is secured for rotation to a midportion of the rigid longitudinally extending frame member 10 and to the right-hand and left-hand outer frame structures 16 and 18. The rockshaft carries at its outer ends rock arms 24 which in turn carry land-engaging wheels 26. The rockshaft 22 is caused to be rotated in a conventional manner, not material to the present invention, the rotation of the rockshaft causing the harrow to be raised and lowered.

Front and rear pairs of disk gangs are carried by the rigid rectangular framework described above for adjustable positioning. Each disk gang includes a gang frame member 28 to which disks 30 are secured in a generally conventional manner. The disk gangs may be disposed either in a working position, shown in the full lines in FIG. 1, or in a transport position, shown in the dotted lines in FIG. 1. To this end front and rear slide members are disposed about the front and rear end portions of the main frame member 10. Each of the slide members is provided with sleeve portion 32 having oppositely disposed apertures (not shown) in the sidewalls thereof, and transversely extending brackets 34. The main frame member 10 is provided with front and rear series of oppositely disposed side apertures 38 (FIG. 2), and the sleeve members 32 are secured to the main frame member 10 in various positions of adjustment by means of bolts 36 which are passed through the apertures in the sleeve portion 32 and the desired apertures 38 in the main frame member 10. The inner ends of the gang frame members are in turn pivotally secured to the laterally extending brackets 34 by means of pivot pins 40.

Figure 3:
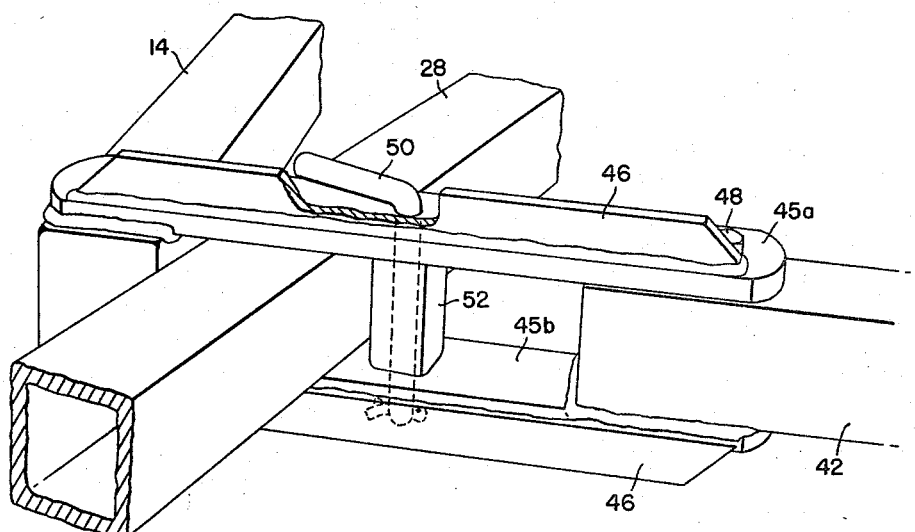
FIG. 3 is an enlarged perspective view showing a portion of the harrow.

The right-hand and left-hand outer frame structures 16 and 18 are substantially identical and each is formed of a central beam 42 to which is rotatably secured the rockshaft 22, upper and lower forwardly extending spaced apart members 44a, and 44b, respectively, and upper and lower rearwardly extending spaced apart members 45a and 45b respectively, the members being provided with reinforcing flanges 46 (FIG. 3). Rigidly secured between the forward ends of the forward members 44a and 44b are the outer ends of the front transverse frame structure 12, and rigidly secured between the rear ends of the rearwardly extending members 45a and 45b are the outer ends of the rear transverse frame structure 14. As can best be seen from FIG. 3 the members 45a and 45b may be secured to the associated structure by welding the rearward end of the upper member 45a to the outer end of the rear frame structure 14, and by welding the forward end of the lower member 45b to the rearward end of the central beam 42, the other ends of the members 45a and 45b being secured to their associated structure by bolts 48. The forwardly extending members 44a, 44b are secured in a, similar manner. By employing this manner of securement, it is possible to disassemble the structure 14 from the central beam merely by removing the bolts 48, this in turn permitting the gang frame member to become disassociated from the outer longitudinally extending frame structure and the transversely extending frame structure.

A relatively long aperture is defined between the ends of the central member 42, the upper and lower members 44a and 44b or 45a and 45b, and the end of the associated frame structure 12 or 14, respectively, as can best be seen from FIG. 3. An outer end portion of a gang frame member 28 is normally disposed within the aperture and is adapted to be held in one of two selected positions by means of a pin 50 about which is provided an abutable sleeve 52. The pin is received in cooperating apertures in the upper and lower members 44a and 44b or 45a and 45b, and cotter pin means or a similar device may be employed to maintain the pin within the apertures.

To move the disk gangs from their working position illustrated in the full lines in FIG. 1 to their transport position illustrated in dotted lines, it is necessary to move the outer ends of the gangs inwardly towards the midportion of the outer longitudinally extending frame structures 16 and 18, and to shift the slide members outwardly of the center of the rigid frame member 10, this last step causing the outer ends of the disk gangs to be moved even more towards the center of the longitudinally extending outer frame structures 16 and 18 as can readily be seen.

To move the slide members outwardly toward the associated transverse frame structure and away from the center of the longitudinally extending main frame member 10, it is necessary to remove the bolts 36 from the corresponding apertures 38, and to slide the sleeve 32 and bracket 34 away from each other and towards the dotted line position, and then to reinsert the bolt 36 into the aperture associated with the selected position. To move the outer end portions of the disk gangs inwardly from their working position to the collapsed position wherein the gangs are moved towards the center of the frame structure, it is necessary to pull the pins 50 and sleeve 52 and then to shift the gang frame member 28 from the normal working position, which is shown in FIG. 3, to the other side of the pin, at which time the harrow gangs will assume the collapsed transport position shown in dotted lines in FIG. 1. To maintain the harrow in the collapsed position, it is necessary to reinsert the pin 50 and sleeve 52.

To further reduce the overall length of the harrow, it is necessary to remove the draft frame 20. To this end the front transverse frame structure 12 is made of right-hand and left-hand beams 54 and 56, respectively, and these members are secured to each other and to the forward end of the main frame member 10 by means of upper and lower reinforced plates 58 and 60, respectively, each of the plates being welded or otherwise secured at their ends to inner ends of the beams 54 and 56, and the plates are also secured at their midportions to the forward end of the main frame member 10 by welding or the like.

Figure 2:
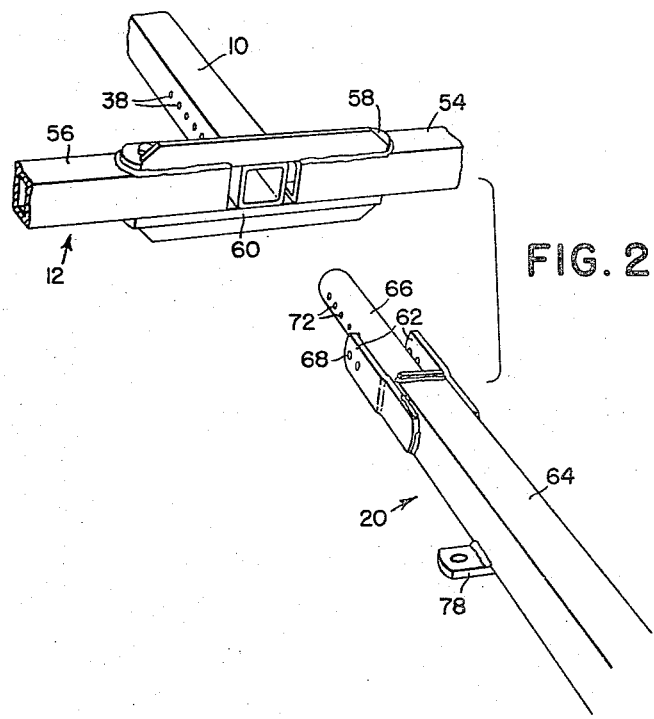
FIG. 2 is an exploded perspective view of the front portion of the harrow and the draft frame showing the manner in which the draft frame may be removed from the harrow.

The parts are so arranged and constructed that spaces are disposed between the inner ends of the beams and the forward end of the main frame member 10 as can best be seen from FIG. 2. Disposed within these spaces when the draft frame 20 is secured to the harrow are rearwardly extending bars 62 that are welded at their forward ends to the draft beam 64. Secured to the rear end of the draft beam 64 and disposed between the bars 62 is a pipe-like member 66. The bars are apertured at 68 and pin means 70 (FIG. 1) may be passed through the apertures 68 and corresponding apertures (not shown) in the pipe-like member 66 and also in the main frame member 10 to hold the draft frame to the main frame member 10 in the manner illustrated in FIG. 1. It should also be noted that the pipe-like member 66 is provided with a plurality of apertures 72 that receive the bolt 36 that also passes through the sleeve 32 and main frame member 10.

To provide further reinforcement of the draft bar 64, right-hand and left-hand strap means 74 and 76, respectively, are provided which are secured at their forward ends to outwardly extending ears 78 on the draft bar 64 and at their rear ends to the right and left beams 54 and 56, respectively, which are provided with suitable releasable securing means of a conventional manner not shown.

To remove the draft frame 20 from the harrow, it is only necessary to disconnect the straps 74 and 76, in an obvious manner, and then to pull the pin 70 and also the forward pin 36 to permit the draft bar 64 to be pulled forwardly and away from the harrow frame.

Thus applicants have provided a harrow which can be readily collapsed from an extended working position in which the overall length of the harrow is substantially greater than the maximum legal transport width for highways to a length which is less than the maximum legal width.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

We claim:

A double-action tandem disk harrow comprising: a rigid longitudinally extending main frame member; front and rear transversely extending spaced apart frame structures rigidly secured at their midportions to front and rear ends of said main frame member, respectively; right-hand and left-hand outer frame structures rigidly secured at their ends to the ends of said transverse frame structures; front and rear pairs of disk gangs movable between an angled working position and a transport position, each of said pairs including right and left disk gangs; the length between the outer ends of each pair of gangs being greater than the length of the main frame member, means on said outer frame structures to hold an outer end portion of each of said gangs in one of two selected positions of inward and outward fore-and-aft adjustment; means on the main frame member to longitudinally adjust the inner ends of said gangs between inward and outward positions independently of said means on said outer frame structures, and releasable forwardly extending draft frame means secured to said rigid elongated main frame member, the parts being so arranged and constructed that when the gangs are in their transport position in which the inner ends of said gangs are in their outward position and the outer ends of the gangs are in their inward position the outer ends of the front and rear pairs of disk gangs are disposed between the front and rear transversely extending frame members, and when the gangs are in their angled working position in which the outer ends of said gangs are in their outward position and when the inner ends are in their inward position the outer ends of the front and rear gangs will project forwardly and rearwardly of the front and rear transverse frame members, respectively.

References Cited by the Examiner

UNITED STATES PATENTS

| | | | |
|---|---|---|---|
| 1,147,281 | 7/1915 | Trissel | 172—595 |
| 1,245,295 | 11/1917 | Willis | 172—585 |
| 1,247,017 | 11/1917 | Sharp | 172—595 X |
| 1,462,135 | 7/1923 | Hansmann et al. | 172—677 |
| 1,634,650 | 1/1927 | Coon | 172—254 |
| 1,679,693 | 8/1928 | Tegeler | 172—625 |
| 1,786,863 | 12/1930 | Peterson | 172—600 X |
| 2,683,960 | 7/1954 | Love | 172—441 |
| 2,787,105 | 4/1957 | Witwer | 172—581 X |
| 2,800,757 | 7/1957 | Tufford | 172—595 |
| 2,970,657 | 2/1961 | Toland | 172—596 X |
| 3,039,541 | 6/1962 | Harden | 172—677 |
| 3,107,737 | 10/1963 | Van Sickle et al. | 172—596 X |
| 3,131,775 | 5/1964 | Long | 172—442 X |
| 3,193,023 | 7/1965 | Adee | 172—456 X |

FOREIGN PATENTS

| | | |
|---|---|---|
| 261,994 | 12/1926 | Great Britain. |
| 588,912 | 6/1957 | Great Britain. |
| 52,363 | 1/1921 | Sweden. |

OTHER REFERENCES

John Deere Operator's Manual OM-341-758, pages 2 and 15, received on Sept. 9, 1958.

ABRAHAM G. STONE, *Primary Examiner.*

T. GRAHAM CRAVER, ANTONIO F. GUIDA, *Examiners.*

J. R. OAKS, *Assistant Examiner.*